(12) United States Patent
De La Cruz et al.

(10) Patent No.: US 9,860,444 B1
(45) Date of Patent: Jan. 2, 2018

(54) STEREOGRAPHIC IMAGE DETAIL UNIFORMITY OF A PANORAMIC VIDEO CAPTURE DEVICE HAVING AN OPTICAL GRADIENT

(71) Applicant: VSN TECHNOLOGIES, INC., Fort Lauderdale, FL (US)

(72) Inventors: Moises De La Cruz, Miramar, FL (US); John Shemelynce, Fort Lauderdale, FL (US); Hao Nguyen, Lake Worth, FL (US); Biren Patel, Coral Springs, FL (US); Gustavo D. Leizerovich, Aventura, FL (US); Amit Verma, Sunrise, FL (US)

(73) Assignee: HOYOS INTEGRITY CORPORATION, San Juan, PR (US)

( * ) Notice: Subject to any disclaimer, the term of this patent is extended or adjusted under 35 U.S.C. 154(b) by 462 days.

(21) Appl. No.: 14/578,766

(22) Filed: Dec. 22, 2014

(51) Int. Cl.
*H04N 5/232* (2006.01)
*H04N 13/00* (2006.01)
*G06T 5/00* (2006.01)

(52) U.S. Cl.
CPC ......... *H04N 5/23238* (2013.01); *G06T 5/002* (2013.01); *H04N 13/0018* (2013.01); *H04N 13/0029* (2013.01); *H04N 13/0055* (2013.01); *G06T 2207/10012* (2013.01); *G06T 2207/20182* (2013.01); *G06T 2207/20224* (2013.01)

(58) Field of Classification Search
CPC ........... H04N 5/23238; H04N 13/0018; H04N 13/0029; H04N 13/0055; G06T 5/002
USPC .......................................................... 348/36
See application file for complete search history.

(56) References Cited

U.S. PATENT DOCUMENTS

| 2011/0261993 A1* | 10/2011 | Weiming | ............. | H04N 5/2254 382/100 |
| 2014/0240492 A1* | 8/2014 | Lee | ...................... | H04N 5/2256 348/136 |

\* cited by examiner

*Primary Examiner* — Nguyen Truong
(74) *Attorney, Agent, or Firm* — Patents on Demand P.A.; Brian K. Buchheit

(57) ABSTRACT

A stereographic image associated with a panoramic camera can be identified. The panoramic camera can include of a set of lenses and an image sensor. A pixel degradation curve associated with the image and/or the hardware of the panoramic camera can be determined, as can a sensor geometry of an image sensor used by the panoramic camera. A fixed smoothing function based on the pixel degradation curve and/or the sensor geometry can be created. The fixed smoothing function can be applied to a stereographic image to modify the image so it includes substantially uniform image detail per image region.

20 Claims, 6 Drawing Sheets

Embodiment 130

Donut Image 140

Pixel Degradation Curve 142

Table 150

| Device ID | Optical Profile ID | Curve ID |
|---|---|---|
| Device A | Profile A | Curve A |
| Device B | Profile B | Curve B |
| Device C | Profile C | Curve C |
| Device D | Profile D | Curve D |

Embodiment 160

Embodiment 410

Non-Uniform Image Sensor 412

Pixel Density 416 (e.g., four sensor per cell)

Pixel Density 414 (e.g., one sensor per cell)

Grid Array

Embodiment 430

Non-Uniform Image Sensor 432

Photosensors 436

Non-uniform distribution 434

STEREOGRAPHIC IMAGE DETAIL UNIFORMITY OF A PANORAMIC VIDEO CAPTURE DEVICE HAVING AN OPTICAL GRADIENT

BACKGROUND

The present invention relates to the field of panoramic media capture and, more particularly, to improving stereographic image detail uniformity of a panoramic video capture device having an annular optical gradient.

Panoramic cameras often utilize traditional image sensors to capture a 360 degree view of a real world environment. These image sensors produce a stereographic projection of the real world view as an image. For example, images captured with a 360 degree camera appear as a "little world" doughnut image (e.g., circular image). The characteristics of the projection include resolution, image size, and the like. One property of the projection is often non-uniform distribution of image detail per sensor capture region, which results from environmental light being distorted before being directed an image capture sensor. In other words, an intensity of the light (or an amount of image detail contained within a squared unit of light) striking the image capture sensor is non-uniform.

To explain by example, FIG. 1A (Prior Art) shows a panoramic camera 110 can have an image sensor 111. Image sensor 111, which converts an optical image contained in light into an electronic signal, conventionally is designed for uniform sensor sensitivity 112 per area. That is, an amount of data able to be captured from light striking the image sensor 111 is uniform regardless of which region of the overall image sensor 111 that light strikes. This convention is proper, when the light being directed to the image sensor 111 is of uniform intensity (having uniform image detail) relative to the environmental images being captured.

When an intensity of light is altered prior to being directed to the image sensor 111, however, problems may occur. For example, the panoramic camera 110 of FIG. 1A utilizes a parabolic reflector 109 to reflect light before that light is directed to the image sensor 111. Thus the parabolic reflector 109 alters the lights intensity (amount of image data per unit of light) that strikes regions of the image sensor 111 in a non-uniform manner. The end result is an existence of an annular optical gradient being applied to the intensity of the light. Conventional software that digitally processes the electronic signals representing the image produces an image with differing density (more image detail shown in portions of the image than in other portions relative to the image detail of the real world object) as a result of the annular optical gradient applied to the intensity of the light striking the image sensor 111.

The donut image 115 produced from the image data captured by the image sensor 111 has a non-uniform resolution (e.g., image detail density), where resolution refers to an amount of detail that the donut image 115 holds. The donut image 115 as conventionally produced can have a high image-detail density 113 at the edges and low image-detail density 114 towards the center of the image, as shown.

It should be appreciated that there can be two basic images with associated densities that vary depending on a reference plane. One reference plane is the reference plane at the image sensor, referred to as the sensor reference plane. Another reference plane is the reference plane of an unwrapped image, referred to as the stereographic reference plane.

At the sensor reference plane, the captured image (115) has uniform pixel density per area since pixel density is defined the sensor density, which for sensor 111 is uniform (112). That is, the amount of data recorded per area digitally represented in the electronic signal of the image produced by the image sensor 111 is uniform assuming a uniform geometry of the image sensor, meaning the sensor has uniform sensitivity. This does not mean that the same level of image detail per area is captured since the annular optical gradient distorted the image of the light striking the image sensor 111. Information loss can occur at this sensor reference plane, as the intensity of the light (image detail per square unit of light) striking the sensor 111 is not of uniform intensity. Of course, some loss always occurs when converting an optical image (which is analog) to an electronic signal (which digitally represents data of the analog image). When light striking the image sensor 111 is of uniform intensity (same level of image detail per square unit of light), the resulting loss in the sensor reference plane is also uniform. In panoramic camera 110, however, because of the annular optical gradient, the loss at the sensor reference plane is non-uniform as areas of the image sensor 111 converting light having a greater image detail per square unit experience a greater data loss per area during the analog to digital (A/D) conversion than other areas of the image sensor 111 that converts light of a lessor intensity. Pixel degradation curve 116 is taken from the perspective of the sensor reference plane and represents an effective degradation over area of loss of information in producing the donut image 115. The loss at the edges of the donut image 115, where light intensity was greater due to the annular optical gradient are higher compared to the loss at the center. Different optics of the panoramic camera will produce different pixel degradation curves.

The second reference plane is the stereographic reference plane. In this plane the electronic data (of uniform pixel density) is digitally processed so that optical distortions caused by the parabolic reflector 109 are mathematically reversed. In other words the "raw" donut image 115 is unwrapped to create a flattened image. The stereographic reference plane reverses the effects of the annular optical gradient (the bending of light by the parabolic reflector 109) to provide a pixilated processed image.

To give an imperfect analogy, the stereographic reference plane is effectively the equivalent of taking a rectangular drawing of an image written in pen on a pre-inflated balloon. When the balloon is inflated into a circle, the image is distorted non-uniformly. If the drawing was created using uniform pixels, the portions of the balloon that are most inflated, will have pixels spaced further apart than the portions of the balloon that are less distorted by the inflating. The "edges" of the drawing, therefore have more space per pixel. Since the flat image is still a pixilated image having a uniform distribution of pixels, a smoothing function adding additional pixels to fill in the spaces at the outer edge needs to be applied. Thus, the flat image resulting from unwrapping the donut image 115 requires more pixels to be added to those regions that experienced the greatest loss during the A/D conversion, due to the annular optical gradient. The portions of the donut image 115 attempting to compress the greatest amount of data into the same relative space (high density region 113), which represents the greatest amount of A/D loss, will need more pixels added per area when unwrapped into a flat image compared to the region of the donut image 115 labeled as low density, which represents the lowest amount of A/D loss.

This problem resulting from annular optical distortions as detailed herein is not known to be widely recognized outside this disclosure, nor are the solutions presented herein known to exist in known prior art.

BRIEF SUMMARY

One aspect of the present invention can include a method for improving media of a panoramic video capture device via a fixed smoothing function. A stereographic image associated with a panoramic video capture device, referred to hereafter as a panoramic camera, can be identified. The panoramic camera can include a set of lenses and an image sensor. The hardware and/or results of the hardware can be analyzed to determine a pixel degradation curve associated with the panoramic camera. Variable image detail density of a produced stereographic image can be reduced by applying a smoothing function.

Another aspect of the present invention can include a system for improving media of a panoramic camera via a fixed smoothing function. A smoothing engine can be configured to identify a stereographic image associated with a panoramic camera. The camera can include a set of lenses and an image sensor. The smoothing engine can be able to analyze the image to determine a pixel degradation curve associated with the image. The smoothing engine can be configured to reduce differences in image detail of a stereographic image given the pixel degradation curve by applying a smoothing function.

DETAILED DESCRIPTION

Figure 1A:
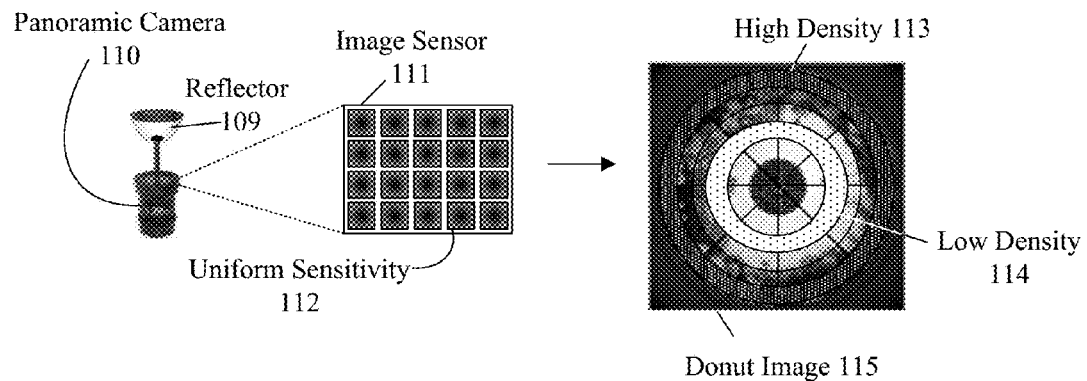
FIG. 1A (Prior art) is a schematic diagram showing a panoramic camera an image sensor.
Figure 1A:
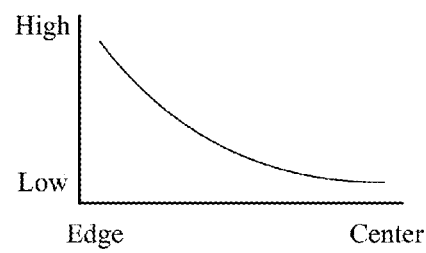

The present disclosure is a solution for improving images resulting from unwrapping a donut image produced by a panoramic camera having a parabolic reflector or other optically distorting element. In the solution, a fixed smoothing function can be defined based on an annular optical gradient that causes a non-uniform intensity of light (image detail) to be captured by different regions of an image sensor. As detailed in the background, the annular optical gradient results in a non-uniform loss during an A/D conversion performed by an image sensor having uniform sensor sensitivity. This in turn results in a donut image produced from the raw data of the image sensor that is digital signal processed into a flat image. This flat image has a need for additional information in accordance with a fixed mathematical formula directly based on the annular optical gradient, assuming an image sensor having uniform sensitivity is used.

In one embodiment, a smoothing function that is mathematically based on the annular optical gradient (and/or the non-uniform pixel loss during the A/D conversion which are effectively equivalent to each other) can be applied to the flat image resulting from digital signal processing the donut image. This is an optimal smoothing function defined by the optical characteristics of the panoramic camera itself (specifically based on the shape of the parabolic reflector and its resulting image distortion that produces the annular optical gradient), which is a fixed smoothing function able to be applied to all image conversions for that device. This approach is believed to leverage knowledge of the pattern of image detail loss when implementing a smoothing function, which results in a faster and more accurate detail-smoothed image than an application of conventional techniques that generically adjust an image without knowledge of an associated gradient effect.

In another embodiment of the disclosure, an image sensor can be constructed with a non-uniform sensor sensitivity to produce a more normalized A/D degradation (effectively a hardware compensation for the annular optical gradient). In this embodiment, the donut image produced by the image sensor having non-uniform sensitivity will have a non-uniform information density, which minimizes the amount of smoothing required of a smoothing function that is applied after the donut image is digital signal processed to produce the flat image of a panoramic scene. Some level of smoothing may be needed due to manufacturing concerns making it situationally impractical to perfectly match the sensitivity of the image sensor to the light intensity distortions from the parabolic reflector. In this embodiment, the smoothing function can be mathematically constructed based on the distribution of sensitivity of the image sensor components compared to the annular optical gradient of the panoramic device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
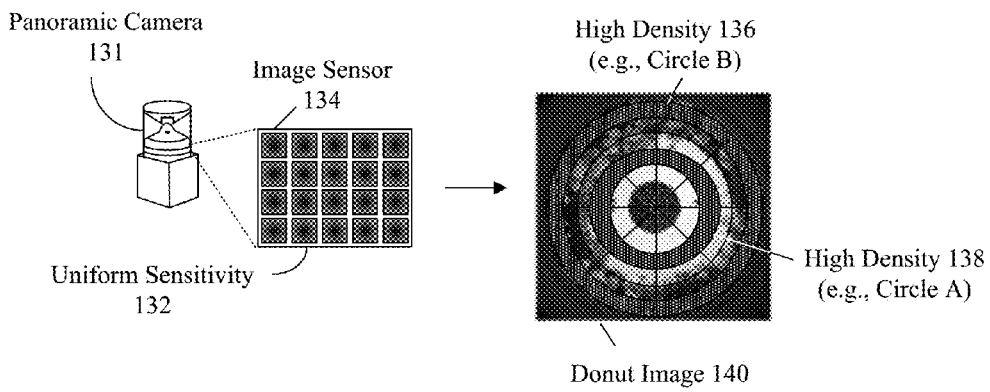
FIG. 1B illustrates a set of embodiments for improving media of a panoramic camera via a fixed smoothing function in accordance with an embodiment of the inventive arrangements disclosed herein.
Figure 1B:
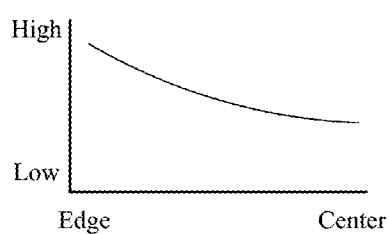
Figure 1B:
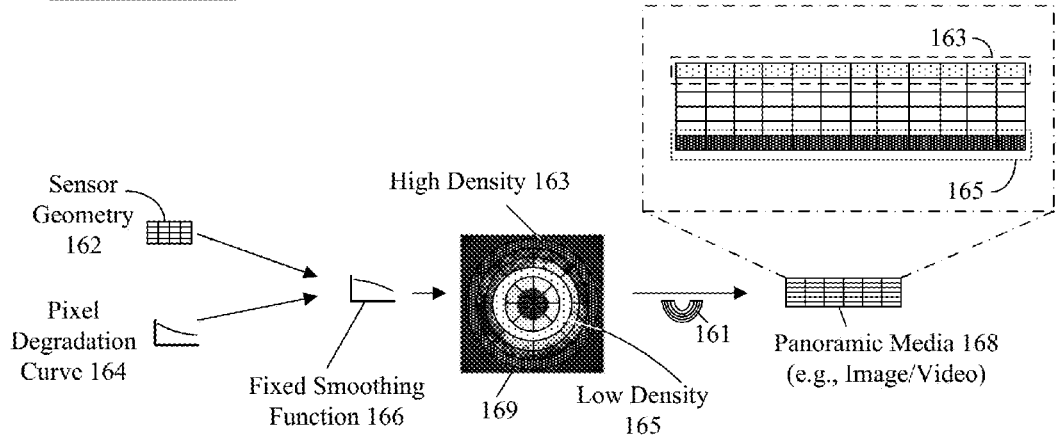

FIG. 1B is a schematic diagram illustrating a set of embodiments 130, 160 for improving flat images produced by a panoramic camera via a fixed smoothing function in accordance with an embodiment of the inventive arrangements disclosed herein. Embodiments 130, 160 can be performed in the context of embodiments 170, 180, method 200, embodiments 300A, B.

As used herein, panoramic camera 131 can be a hardware/software device able to provide a view of a real world environment. Camera 131 can include, but is not limited to, one or more lens elements, a lens stack, an aperture, a quadric reflector, and the like. Camera 131 can capture a 360° field of view which can conform to a stereographic projection, curvilinear projection, and the like. The quadric reflector (which may be a parabolic reflector in some embodiments but is not restricted in this regard) reflects light before it is processed by the image sensor 134. The reflected light is distorted, which results in some areas of the sensors 134 receiving a greater intensity of light that contains more image information than others. This distortion is referred to as an annular optical gradient. The term annular optical gradient refers to an approximately circular increase/decrease in magnitude of a concentration of the amount of detail an image holds within an area due to the optical reflective distortions caused by the quadric reflector. Although an annular gradient is used throughout this disclosure, other gradients are possible, which are not circular, and can be compensated for utilizing the techniques disclosed herein. Thus, the scope of the disclosure is not limited in this regard.

As used herein, a stereographic projection can be the projection of a sphere, as seen from the pole, onto a flat surface (e.g., light rays from 360° view striking an image sensor). For example, a 360° view of environment can be projected onto a display as a circular panorama with the center of the circular panorama lacking image information (e.g., blacked out).

As used herein, panoramic camera 131 can be a camera with a 360-degree field of view in the horizontal plane, or with a visual field that covers approximately the 360-degree field of view. In one instance, camera 131 can be a one shot camera which can capture a panoramic field of view. For example, camera 131 can be a 360° camera which can capture a region of 270° horizontally and 90° vertically. Device 116 can include a still camera mode, a video camera mode, and the like.

An image sensor 134 can be an electromechnical component which converts an optical image into an electronic signal. Image sensor 134 can conform to one or more traditional and/or proprietary technologies. Technologies can include, but is not limited to, semiconductor charge-coupled devices (CCD) or active pixel sensors in complementary metal-oxide-semiconductor (CMOS) or N-type metal-oxide-semiconductor (NMOS, Live MOS) technologies. Image sensor 134 architecture can include one or more photosensors, microlenses, and the like. In one embodiment, sensor 134 geometry and/or architecture can be implemented within traditional and/or proprietary image sensor formats including, but not limited to, 2/3 rds, 4/3 rds, full frame (e.g., 35 mm) and the like.

Sensor 134 characteristics can include, but is not limited to, resolution, optical format, frame rate, aspect ratio, pixel size, pixel count, and the like. It should be appreciated that the disclosure can be implemented to account for variation in sensor materials which can include differences in sensor characteristics such as pixel noise (e.g., shot noise, read noise, dark noise), pixel cross-talk, substrate penetration, and fill factor. It should be understood that image sensor format can include the shape and size of the image sensor 134.

As used herein, discussions of image quality, resolution, and other characteristics can be defined at three reference planes. The first reference plane is an analog reference plane. The analog reference plane includes an object, which is visually captured within an image. An effective pixel density and optical resolution of the object in the analog reference plane can be infinite for practical purposes since an image sensor has not quantized it yet.

The second reference plane is the sensor reference plane. In the sensor reference plane, the image sensor 134 converts an optical image into an electronic signal. In doing so, an analog to digital (A/D) conversion occurs. In the second reference plane, resolution is often defined by pixel density, which is dependent on a sensitivity of the image sensor. An image sensor 134 with a uniform sensor sensitivity per area produces an image at this second reference plane with uniform pixel density. Each pixel of the uniform pixel density has the same amount of data representing the image as each other pixel. An image sensor 134 with a non-uniform sensor sensitivity per area will produce an image at this second reference plan with a non-uniform pixel density. In the described embodiments, the image at the second reference plane can conform to a donut shape. The aspect ratio of the donut image in the second reference plane is different from the aspect ratio of the image in the first reference plane due to optical distortions. These optical distortions may be caused by the reflector(s) of the panoramic camera 131.

The third reference plane, which is referred to as the stereographic reference plane, can be the post processed or "unwrapped" image. That is, the donut shaped image is converted through a digital signal processing operation to create a flat panoramic image. The flat panoramic image refers to an image having an aspect ratio approximately or substantially equivalent to that of the object when viewed in the first reference plane. In other words, the image produced by unwrapping the donut image is typically a rectangular shape which resembles the original image defined at the first reference plane. The pixel density at the third reference plane depends on several factors which include the pixel density of the donut image and the image post processing function that transforms the image from the second reference plane into the image of the third reference plane.

In embodiment 130, image sensor 134 can be designed for uniform sensor sensitivity. That is, each subarea of the image sensor has the same relative sensitivity for converting light into electronic data as every other subarea of the image sensor 134. This uniform sensor sensitivity results in a production of a donut image 140 having a uniform pixel density. For instance, the photosensor array of the image sensor 134 can conform to a grid with an equal distribution of photosensors. The panoramic camera 131, however, has an annular optical gradient, which results in non-uniform image information loss when the image sensor 134 performs the A/D conversion. This is because the density of image information has been optically biased by the quadric reflector so that some regions of image filled data being captured by the image sensor 134 contain more optical information about the object in the first reference plane than others, yet the sensitivity of the image sensor 134 is uniform. Visually, the donut image 140 appears to compress more of the image (shown as high density region 136 and high density region 138) than others. These high density regions 136, 138 actually represent the areas of greatest information loss during the A/D conversion.

Pixel degradation curve 142 is shown to represent information loss, resulting from the annular optical distortion and the uniform sensor sensitivity 132. The curve 142 is non-uniform, since the image information loss is non-uniform. It should be appreciated that the relationship between the pixel degradation curve and the optics of the panoramic camera can be arbitrarily complex. In one instance, the pixel degradation curve can be a one-to-one mapping to optical refractivity and/or focusing. For example, improving the optics of the device can create a linear improvement in the pixel degradation curve.

Table 150 can illustrate a set of different devices with different optical profiles and the corresponding pixel degradation curves. For example, a device A with an optical profile A can have a pixel degradation curve A. It should be appreciated, mass produced devices can be analyzed (e.g., ray traced) to determine a unique optical profile for each of the devices. That is, once a degradation curve is known for the device/optics, the curve can be utilized as an input (e.g., variable) for generating an appropriate smoothing function.

Once the pixel degradation curve 142 for a given panoramic camera 131 and the image sensor geometry are known, a fixed smoothing function is able to be defined. The fixed smoothing function is applied when converting the donut image 140 of reference plane two into the flat image of reference plane three. To elaborate as illustrated by embodiment 160, a sensor geometry 162 and a pixel degradation curve 164 parameters can be utilized to create a fixed smoothing function for an image sensor (e.g., sensor 134) of a panoramic camera (e.g., 131). The fixed smoothing function can be determined manually, semi-automatically, or automatically. In one embodiment, the fixed smoothing function 166 can be employed to enhance a panoramic media 168. In the embodiment, the smoothing function 166 can be an additive smoothing function which can increase the pixel density of regions of media 168. For example, the function 166 can include Laplace smoothing technique. The smoothing function can be applied at the third reference plane to improve a look of the resulting panoramic media (e.g., media 168).

To briefly elaborate, vertical lines of the original image at the first reference plane can be converted to radial lines in the sensor image (e.g., 168) at the second reference plane. This conversion is typically nonlinear, in other words, segments of equal length in a vertical line convert to segments of non-equal length in a radial line. The non-linear nature of the conversion could be corrected through a distortion correcting function that takes place between the second and third reference planes. A consequence of the non-linear conversion of vertical lines is that vertical segments of the original image at the first reference plane which result in radial segments close to the center of the donut shape at the second reference plane can have a lower image density than the ones that result in radial segments far from the center of the donut shape of the sensor image at the second reference plane when using a sensor image with uniform sensitivity. This difference apparent in the second reference plane in the donut image 169 regarding segments of equal length at the first reference plane can be compensated by the use of an interpolation function using the same fundamental concept as the one used for the horizontal lines. An alternate method of avoiding the image detail density differences is the use of a non-linear sensor with a high sensitivity in areas closer to the center of the donut shape.

A variety of well established interpolation functions could be used for the horizontal and vertical pixel compensations. These compensations can be applied before or after the unwrapping (e.g., 161) of the donut shape when transitioning from the second to the third reference plane. The compensation could also be an integral part of the unwrapping function taking place at the same time as the unwrapping operation.

In one instance, increasing the sampling window during sensor read (e.g., from higher pixel density, sampling rate) can be utilized to capture additional information which can be utilized during a smoothing function to produce high image quality with a uniform pixel density. In one embodiment, the smoothing function 166 can be a functionality of a smoothing algorithm which can be arbitrarily complex. In one instance, function 166 can be a functionality of a smoothing engine configured to enhance the image resolution of portions of media 168. In one embodiment, smoothing function 166 can interpolate pixels utilizing traditional (e.g., supersampling) and/or proprietary techniques. In one instance, an image information density threshold can be manually and/or automatically established for a panoramic media 168. In the instance, the media can be analyzed to determine regions which do not meet the image density threshold and a smoothing function 166 can be applied. The image density threshold can include, but is not limited to, a numerical value, a fuzzy logic value. That is, threshold can be arbitrarily complex.

Turning back to embodiment 160, in a pure software implementation for smoothing correction, the image sensor 111 has a sensor geometry with uniform sensor sensitivity. The smoothing corrections therefore occur in the third reference plane, after A/D loss occurs in the second reference plane. Accordingly, a donut image 169 is produced at the second reference plane. Visually, there are regions of high density 163 and low density 165 image compression of the donut image 169 where high density 163 areas represent a greater image data A/D loss at the sensor 111 compared to low density 165 regions of the donut image 169. The smoothing function 161 is a digital signal processing operation, applied after/before/during the linear transformation that converts the donut image 169 into a more rectangular (although other presentation/output geometries are possible) into panoramic media 168, which has an aspect ratio for the included object approximately equivalent to the aspect ratio of the real world object (in the first reference plane). The areas indicated as high density 163 in the donut image 169 when transformed (i.e., flattened or unwrapped 161) into the panoramic media 168 have less resolution than the areas indicated as low density 165 due to information loss because of the annular optical gradient inherent in the panoramic camera 131. The smoothing function 166 adds additional information to these areas in accordance with the information loss to create an effect of a panoramic media 168 having uniform image information density post processing (post application of the fixed smoothing function 166). Thus, the region of the panoramic media 168 corresponding to the high density region 163 is enhanced by digitally increasing effective resolution per the smoothing function 166. The number of pixels added conforms to the pixel degradation curve 164 (and or the sensor geometry 162), as represented by information density dots 163 and 165. In a situation where uniform effective pixel density is desired in the panoramic media 168, but image accuracy is a stronger factor than a high effective resolution, the fixed smoothing function 166 can be calibrated in the opposite way to subtract image data from the regions that experienced less information loss at the A/D conversion stage to match the image density of the region experiencing a greater loss. Thus, instead of extrapolating image points that are non-existent, which may result in an inaccurate image as information points are estimated during the extrapolation, known information points can be subtracted. Appreciably, the fixed smoothing function 166 can be tailored within the continuum of extrapolation/subtraction to achieve a desired accuracy and effective resolution of the panoramic media 168. For simplicity of expression, the disclosure examples hereafter assume an additive extrapolation of additional image data for the portions of the panoramic media 168 that experiences the greatest information loss post unwrapping 161, yet the scope of the disclosure is not so limited.

An alternative implementation of the disclosure permits a hardware based solution that compensates for the annular optical gradient. In the hardware solution, the sensor geometry 162 is biased so that it does not have uniform sensor sensitivity, but instead has a sensitivity increased in regions to more closely match the annular optical gradient. Thus, A/D loss at the second reference is more uniform, as increased data is captured during the A/D conversion (captured in the electronic data produced by the image sensor 134). The donut image 169 in such an embodiment has a non-uniform information density. That is, high density 163 regions of image information include proportionally more data electronically compared to low density 165 portions of the image. In an ideal situation, no smoothing function is necessary, since the unwrapping 161 of the donut image 169 results in the panoramic media 168 having a uniform pixel density, which is accurate due to the sensor geometry 162 matching the annular optical gradient. In practice, manufacturing concerns result in the sensor geometry 162 not perfectly matching the annular optical gradient, some pixel degradation (non-uniform) will occur, as reflected in a tailored pixel degradation curve 164, which is used to mathematically construct the fixed smoothing function 166 also tailored for the sensor geometry 162.

The disclosure contemplates any mixture of hardware and software corrections (the adjustments to the fixed smoothing function 166 applied are dependent on sensor geometry 162 and the pixel degradation curve 164 occurring at the second reference plane), as can be readily understood from the above examples (showing both extreme ends of the correction spectrum, where a hybrid software/hardware approach is applied within the continuum between these extremes). In another example, additional sampling rates can be applied non-uniformly to provide additional image data to regions that need it.

In contemplated embodiments, additional hardware corrective measures can be applied, which are not exclusively dependent on altering the sensitivity of the image sensor in a non-uniform manner. For example, additional mirrors and other reflectors can be incorporated to capture additional optical information, thereby reducing the effective severity of the annular optical gradient, which is being compensated for herein.

Drawings presented herein are for illustrative purposes only and should not be construed to limit the invention in any regard. It should be appreciated that the disclosure can support high dynamic range (HDR) imaging. It should be appreciated that the disclosure can utilize feature detection, calibration, blending, and the like to produce a panoramic media. Media 168 can conform to any traditional and/or proprietary formats including, but not limited to, Joint Photographic Experts Group (JPEG), Tagged Image File Format (TIFF), Moving Picture Experts Group (MPEG), Audio Video Interleave (AVI), Portable Network Graphics (PNG), and the like.

Figure 1C:
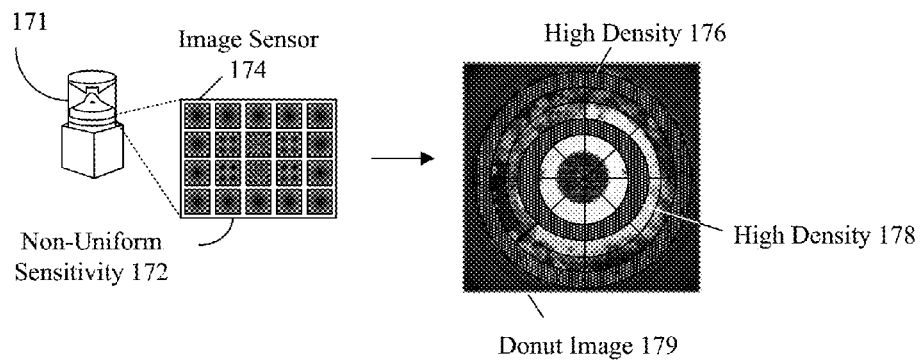
FIG. 1C illustrates a set of embodiments for improving media of a panoramic camera via a fixed smoothing function in accordance with an embodiment of the inventive arrangements disclosed herein.
Figure 1C:
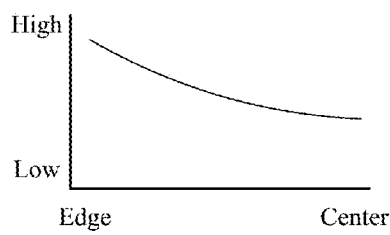
Figure 1C:
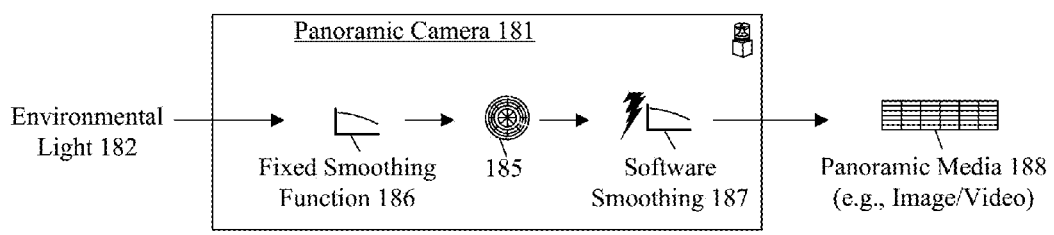

FIG. 1C is a schematic diagram illustrating a set of embodiments 170, 180 for improving media of a panoramic camera via a fixed smoothing function in accordance with an embodiment of the inventive arrangements disclosed herein. Embodiments 170, 180 can be performed in the context of embodiments 130, 160, method 200, embodiments 300A, B.

In embodiment 170, a panoramic camera 171 can have an image sensor 174. Image sensor 174 can have proprietary characteristics which can include non-uniform pixel density 161. That is, the photosensor array of the image sensor 174 can conform to a grid with an equal distribution of photosensors. The sensor 174 can produce an image 179 with non-uniform information density per area. That is, image 179 can have a high information density at the edges and towards the center of the image. In one instance, a more uniform pixel density of the donut image can be achieved by permitting the sensor 174 of the camera 171 to capture greater quantities of environmental light to regions of an image sensor which would traditionally be associated with low pixel density. Thus, light intensity is adjusted to compensate for the annular optical gradient.

It should be appreciated that a range of tolerances can be associated with the device (e.g., calibration, configuration settings) to enable sensor reuse for different devices with different optical profiles. For example, the 7 optics (e.g., 374-386) can be configured to be adjustable within the range of tolerances to enable environmental light to strike different portions of the sensor based on the adjusting. It should be appreciated that the configuration can be performed so that a hardware calibration can permit the reuse and/or optimization of a sensor with non-uniform image density characteristics. The optics (e.g., 374-386) can be adjustable at a manufacturing factor within the range, causing appreciable amounts of environmental light to strike the center of the sensor. In one instance, adjustments to the mirror 330 (e.g., height, curvature) can be performed to alter the pixel degradation curve 175.

In embodiment 180, a dual smoothing approach can be performed to achieve a stereographic image with uniform pixel density and uniform image information density across the regions of the panoramic media 188. In the embodiment, environmental light can be captured by a panoramic camera 181. The device 181 can include a sensor 174 with non-uniform sensitivity. Sensor 174 can capture environmental light in accordance with a fixed smoothing function 186 associated with a previously established pixel degradation curve of the sensor 174. In one instance, an intermediate temporary media 185 can be generated. The media 185 can be subjected to a software smoothing operation 187 which can produce a panoramic media 188. For example, the smoothing operation 187 can be performed to adjust for deviations of the device 181 optics and/or the fixed smoothing function 186. The media 188 can be a media with a uniform pixel density and uniform image resolution. It should be appreciated that media 185 can be an optional element of the embodiment 180.

Figure 2:
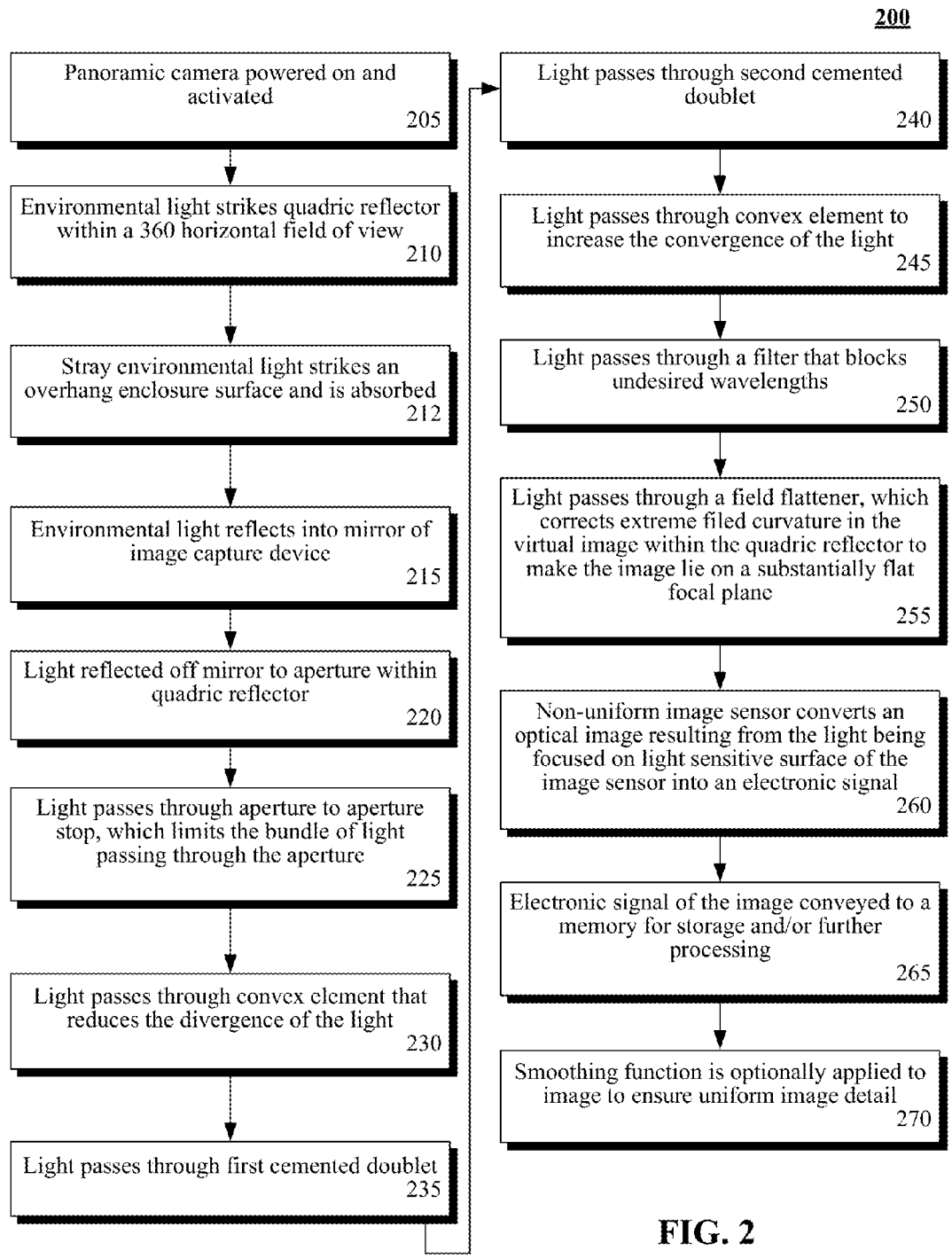
FIG. 2 illustrates a method for improving media of a panoramic camera via a fixed smoothing function in accordance with an embodiment of the inventive arrangements disclosed herein.

FIG. 2 is a schematic diagram illustrating a method 200 for improving media of a panoramic camera via a fixed smoothing function in accordance with an embodiment of the inventive arrangements disclosed herein. Method 200 can be performed in the context of embodiment 130, 160, and/or embodiments 300A, B.

FIG. 2 shows a flow chart for a panoramic camera in accordance with embodiments of the disclosure. The process can begin in step 205, where panoramic camera is powered on and activated. In step 210, environmental light strikes a quadric reflector within a 360 horizontal field of view (FOV). Thus, a scene surrounding the optical device is concurrently captured within this 360. The vertical field of view depends on construction, but in one embodiment includes angles between negative fifteen degrees and positive 45 degrees. In step 212, stray environmental light strikes an overhang enclosure surface of the camera and is absorbed. In step 215, environmental light reflects from the quadric reflector to a mirror of the one-shot panoramic camera. The mirror can be positioned directly above the aperture of the quadric reflector in one embodiment. The mirror may be substantially flat (within +/− five percent of being flat). In step 220, light reflected off the mirror can enter an aperture of the quadric reflector.

A set of optical elements can reside on an opposite side of the aperture in embodiments of the disclosure. The described optical elements need not be present in every contemplated configuration of the disclosure and additional elements may be included in contemplated configurations of the disclosure. In step 225, light can pass through the aperture to an aperture stop, which limits the bundles of light passing through. In step 230, light can pass through a convex element that reduces the divergence of the light. In step 235, light can pass through a first cemented doublet to pass through a second cemented doublet in step 240. These doublets can be paired to reduce divergence of the light then to increase convergence (see elements 316, 318, 320, and 322 of FIG. 3, for example). Other embodiments are contemplated, where a single doublet is utilized, or where multiple paired doublets (more than two) are utilized. In step 245, light passes through a filter that blocks undesired wavelengths. For example, infrared, violet, and/or ultraviolet wavelengths may be undesired in that they contribute to blurring the image and producing color rendering errors in some embodiments of the disclosure.

In step 255, light passes through a field flattener, which corrects for extreme curvature in the virtual image due to the conic shape of the quadric reflector. This makes the image lie on a substantially flat (within +/−10 percent of being flat) focal plane. In step 260, a non-uniform image sensor converts an optical image resulting from the light being focused on a light sensitive surface of the optical sensor into an electronic signal. This light has been distorted by the optics resulting in an effective application of an annular optical gradient. The light is converted by the sensor into electronic data. Some A/D loss of image information occurs at this point. In step 265, the electronic signal representing the electronic data can be conveyed to a memory for storage and/or further processing. For example, a raw image can be saved to a non-transitory memory in one embodiment, which may be projected from a panoramic projector. The raw image may be later processed by a computing device. In another implementation, the electronic signal may be digitally processing, using a variety of digital signal processing techniques and saved post-processing to a non-transitory memory and/or be visually displayed on a screen as a panoramic scene. In step 270, a smoothing function can be optionally applied to the image to achieve effective uniform resolution across different regions of the image. In one instance, the disclosure can leverage an additive smoothing function which can increase image information density to improve image quality where unprocessed image information density is below a previously established density threshold.

Figure 3A:
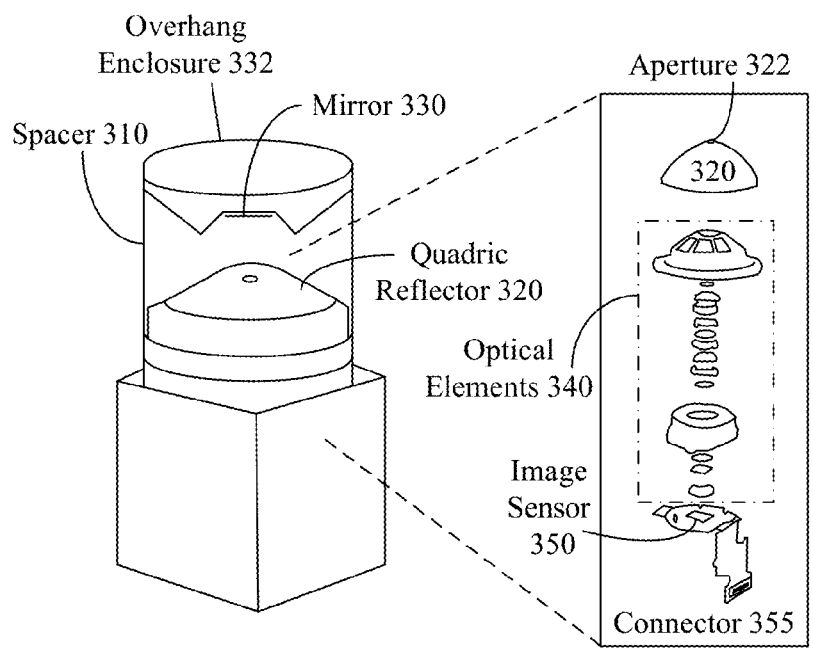
FIG. 3A illustrates an embodiment for improving media of a panoramic camera via a fixed smoothing function in accordance with an embodiment of the inventive arrangements disclosed herein.

FIG. 3A is a schematic diagram illustrating an embodiment 300A for improving media of a panoramic camera via a fixed smoothing function in accordance with an embodiment of the inventive arrangements disclosed herein.

Referring to FIG. 3A, a panoramic optical device is shown and described in accordance with embodiments of the disclosure. The device includes an overhang enclosure 332, a quadric reflector 320, a reflecting mirror 330, and a spacer 310, though which light passes. The quadric reflector 320 includes a hole or aperture 322 in its apex.

In one embodiment, a set of components included in a base of the panoramic optical device includes optical elements 340 and an image sensor 350 electrically coupled to connector 355. The optical elements 340 guide light reflected off mirror 320 to strike sensor 350. The optical elements may also filter undesired optical wavelengths, correct for color aberrations that would otherwise cause different colors to focus at different planes and positions, and/or ensure despite distortions from the quadric reflector 320 that the optical image substantially lays on a flat focal plane.

The overhang enclosure 332 can be utilized to restrict and/or eliminate secondary reflections from environmental light entering the aperture 322. In one instance, enclosure 332 material can include polymethyl methacrylate (PMMA, or acrylic), thermoplastic polymers, and the like.

The quadric reflector 320 is a reflective conical surface, which may be a parabolic surface, a hyperbolic surface, a hemispherical surface, or an elliptic surface. More specifically, the quadric reflector 320 as used herein is a non-degenerate real quadratic surface that tapers from a wide base towards an apex, where the aperture 322 is positioned.

The image sensor 350 is a component that converts an optical image into an electronic signal. Any of a variety of image sensors technologies can be for the image sensor 350 including, but not limited to, semiconductor charge-coupled devices (CCD), active pixel sensors in complementary metal-oxide-semiconductor (CMOS), and N-type metal-oxide-semiconductor (NMOS, Live MOS) technologies.

In embodiments, where the image sensor 350 is replaced with a pico-projector, also referred to as a pocket projector, a mobile projector, a handheld projector or a mini beamer) any of a number of technologies can be utilized including, but not limited to digital light processing (DLP), MICROVISION's beam-steering, and LCoS (Liquid crystal on silicon) based technologies.

In one embodiment, positive elements of the optical elements 340 can be made from polymethyl methacrylate (PMMA, or acrylic), other transparent thermoplastic, glass, or other suitable substances. Negative ones of the optical elements 340 can be made of polycarbonate, other thermoplastic polymers, or other suitable substances.

Figure 3B:
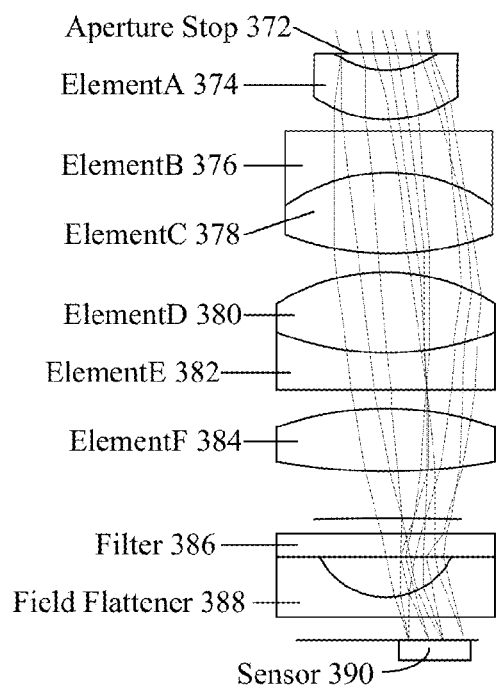
FIG. 3B illustrates an embodiment for improving media of a panoramic camera via a fixed smoothing function in accordance with an embodiment of the inventive arrangements disclosed herein.

FIG. 3B is a schematic diagram illustrating an embodiment 300B for improving media of a panoramic camera via a fixed smoothing function in accordance with an embodiment of the inventive arrangements disclosed herein. FIG. 3B shows optic elements between the aperture stop 372 and the image sensor 390 in accordance with embodiments of the disclosure. In FIG. 3B, the aperture stop 372 limits the bundle of light that passes through the optical elements.

ElementA 374 captures light passing through the aperture stop and reduces its divergence. In one embodiment, cemented doublets can be formed from ElementB 376 and ElementC 378. ElementD 380 and ElementE 382 produce a converging beam and correct color aberrations that would otherwise cause different colors to be focused at different planes and positions. ElementF 384 increases convergence of the light. A flat filter 386 can be used to block infrared, violet, and ultraviolet radiation. The filtered wavelengths can blur the image and produce color rendering errors in some embodiments. The field flattener 388 corrects extreme field curvature in the virtual image within the quadric reflector 320. The field flattener 388 results in the image sent to the sensor 390 lying flat on a focal plane. Not all elements 372-288 are needed in all embodiments and further elements (not shown) may be included in different contemplated embodiment of the disclosure.

It should be appreciated that image sensor 350, 390 can include a sensor having a non-uniform sensitivity or can include a traditional sensor with uniform sensitivity. In embodiments which include a traditional image sensor, it should be appreciated that one or more smoothing functions (e.g., fixed smoothing function 166) can be utilized as detailed herein.

Figure 4:
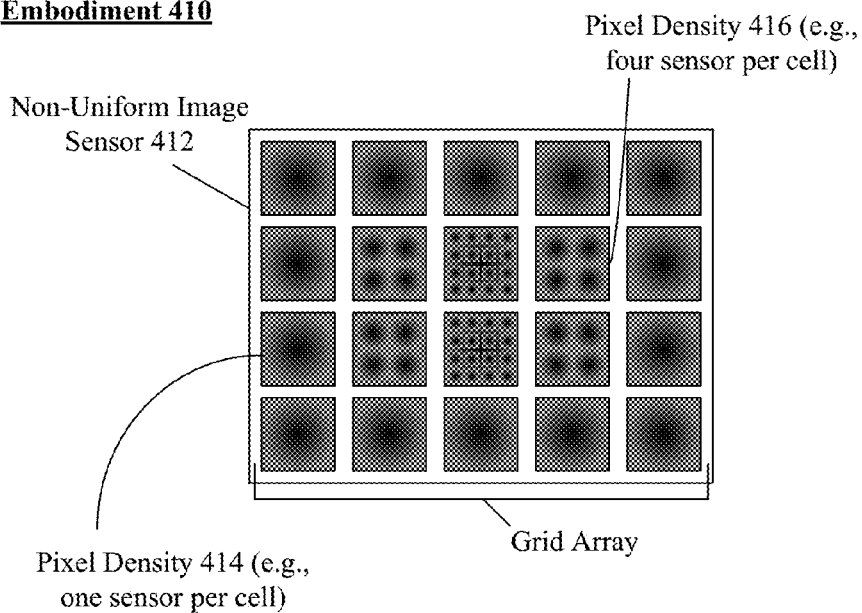
FIG. 4 illustrates a set of embodiments for improving media of a panoramic camera via a fixed smoothing function in accordance with an embodiment of the inventive arrangements disclosed herein.
Figure 4:
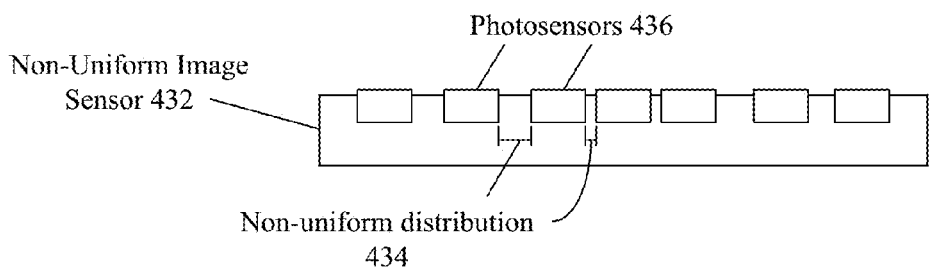

FIG. 4 is a schematic diagram illustrating a set of embodiments 410, 430 for improving media of a panoramic camera via a fixed smoothing function in accordance with an embodiment of the inventive arrangements disclosed herein. Embodiment 410 can be present in the context of embodiment 130, 160, system 200, and/or embodiment 300A, B.

Embodiment 410 illustrates an exemplary configuration for a sensor 412 having non-uniform sensitivity. In one instance, the sensor 412 sensitivity can conform to a fixed smoothing function (e.g., 166) resulting in a reduced pixel degradation curve versus traditional uniform image sensors. The non-uniform sensitivity corresponds to the annular optical gradient resulting from optics used by the panoramic camera. For example, the image sensor can have an increased information capture density 416 (e.g., a four sensor array per cell) in the center and a decreased information capture density 414 at the edges (e.g., a one sensor array per cell). For example, by varying microlense sizes within the array, additional information capture density can be created. It should be appreciated that the disclosure can be implemented to account for limitations of optical (e.g., optical diffraction), electrical components (e.g., sensor sensitivity), materials (e.g., conductivity), and the like.

Embodiment 430 illustrates an exemplary configuration for a sensor 432 with a non-uniform sensitivity. In another instance, varying photosensor 436 distances within the sensor 432 can introduce higher information capture densities in regions where this is necessary due to the annular optical gradient of image containing light striking that region of the sensor 430. For example, non-uniform distribution 434 can permit higher information capture density per area enabling a fixed smoothing curve mapping.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of improving quality of a panoramic image comprising:
utilizing a panoramic camera with a quadric reflector to capture a panoramic scene including a real-world object;
the quadric reflector distorting light striking an image sensor imposing an annular optical gradient on the real-world object;
the image sensor converting the light into a digitally encoded electronic signal, wherein the converting is an analog to digital transformation of the image that is effected by the annular optical gradient from the quadric reflector, wherein the annular optical gradient causes a non-uniform distribution of image detail per square unit of the light striking the image sensor;
defining a fixed smoothing function based on sensor geometry of the image sensor, on a pixel degradation curve, or on a combination of the image sensor and the pixel degradation curve, wherein the fixed smoothing function is specific to hardware used by the panoramic camera;
creating a donut image from the digital encoded electronic signal, where the donut image has an aspect ratio divergent from that of the real-world object;
converting the donut image into a stereographic image having an aspect ratio approximately equivalent to that of the real world object; and
applying the smoothing function to modify the stereographic image so that the modified image shows substantially uniform image detail per image region.

2. The method of claim 1, wherein the smoothing function extrapolates image information points for regions of the stereographic image having less image detail due to hardware induced information loss, wherein the quantity of extrapolated image information is directly proportional to the pixel degradation curve.

3. The method of claim 1, wherein the smoothing function subtracts image information points for regions of the stereographic image having greater image detail due to hardware induced information loss, wherein the quantity of subtracted image information is inversely proportional to the pixel degradation curve.

4. The method of claim 1, wherein the sensor geometry of the image sensor is uniform resulting in the image sensor having uniform sensitivity, wherein the smoothing function is a software or firmware implemented function.

5. The method of claim 1, wherein the sensor geometry of the image sensor is non-uniform resulting in the image sensor having non-uniform sensitivity, wherein the smoothing function is at least partially implemented in hardware by increasing the amount of information captured by regions of the image sensor in portions of the image sensor where the light striking those portions has a relatively high density of image information compared to other portions of the image sensor due to the annular optical gradient.

6. The method of claim 1, wherein the defining defines the smoothing function based on the sensor geometry of the image sensor, which has a non-uniform sensitivity.

7. The method of claim 1, wherein the defining defines the smoothing function based on the pixel degradation curve.

8. The method of claim 1, wherein the defining defines the smoothing function based on the sensor geometry of the image sensor and based on the pixel degradation curve, wherein the image sensor has a non-uniform sensitivity.

9. A method improving quality of a panoramic image comprising:
identifying a stereographic image associated with a panoramic camera having optics that apply an annular optical gradient due to light distorting optics of the panoramic camera, said annular optical gradient resulting in an aspect ratio of an object's image as contained within light striking an image sensor of the panoramic camera being different from an aspect ratio of a real world object;
determining a pixel degradation curve associated with the optical hardware of the panoramic camera, wherein the pixel degradation curve represents image information loss per region of the stereographic image due to non-uniform information loss during the conversion of the image into an electronic signal, wherein the conversion information loss is a result of the annular optical gradient, wherein the image captured by the sensor has an aspect ratio that differs from an aspect ratio of the real world object, wherein the stereographic image has an aspect ratio approximately equivalent to that of the real world object;
establishing a fixed smoothing function based on the pixel degradation curve; and
applying the fixed smoothing function to the stereographic image produced from the image to provide a modified image having substantially uniform image detail per image region.

10. The method of claim 9, further comprising:
analyzes the donut image to determine the pixel degradation curve.

11. The method of claim 9, further comprising:
analyzing the stereographic image to determine the pixel degradation curve.

12. The method of claim 9, further comprising:
analyzing optics of the panoramic camera related to the annular optical gradient to determine the pixel degradation curve.

13. The method of claim 9, further comprising:
analyzing a combination of two or more of the following:
(i) the donut image,
(ii) the stereoscopic image, and
(ii) the optics of the panoramic camera,
to determine the pixel degradation curve.

14. The method of claim 9, further comprising:
a first camera and a second camera, wherein said panoramic camera is the first camera, wherein the pixel degradation curve is referred to as the first pixel degradation curve, and wherein the second camera is a different panoramic camera having optics that produce an annular optical gradient different from that of the first camera;
performing the analyzing for the second camera to produce a second pixel degradation curve, wherein the first and the second pixel degradation curves is different;
constructing or calibrating the fixed smoothing function referred to as the first fixed smoothing function by executing a computer algorithm that utilizes the first pixel degradation curve is a variable input;

constructing or calibrating a second fixed smoothing function for the second camera that utilizes the second pixel degradation curve as a variable input; and applying the second fixed smoothing function for the second camera.

15. The method of claim 9, wherein an image sensor has a uniform sensor sensitivity.

16. The method of claim 9, wherein an image sensor has a non-uniform sensor sensitivity to minimize A/D conversion losses due to the annular optical gradient in comparison with losses that would be produced by a different image sensor having a uniform sensor sensitivity.

17. A panoramic camera comprising:

a quadric reflector which reflects light before the light strikes an image sensor, wherein the quadric reflector results in an optical gradient being applied to information detail optically contained within reflected light;

the image sensor for converting an optical image into digital information that represents the optical image in a stereographic image, wherein the image sensor has a non-uniform sensitivity biased towards collecting a greater amount of data in regions where light striking it contains a greater amount of optical information due to the optical gradient; and wherein the panoramic camera, to convert the optical image to digital information, is configured to:

determine a pixel degradation curve associated with the non-uniform sensitivity, wherein the pixel degradation curve represents image information loss per region of the stereographic image due to non-uniform information loss during the conversion of the optical image into the digital information, wherein the non-uniform information loss is a result of an annular optical gradient, wherein the optical image captured by the image sensor has an aspect ratio that differs from an aspect ratio of a real world object of the optical image, wherein the stereographic image has an aspect ratio approximately equivalent to that of the real world object;

establish a fixed smoothing function based on the pixel degradation curve; and apply the fixed smoothing function to the stereographic image produced from the image to provide a modified image having substantially uniform image detail per image region.

18. The panoramic camera of claim 17, wherein the optical gradient is an annular optical gradient.

19. The panoramic camera of claim 17, wherein the image sensor comprises a plurality of cells in a grid array, wherein a variable number of sensors are contained within different ones of the cells to produce the non-uniform sensitivity.

20. The panoramic camera of claim 17, wherein the image sensor comprises a plurality of photosensors having a non-uniform distribution on the image sensor.

* * * * *